US008916638B2

(12) United States Patent
Schiraldi et al.

(10) Patent No.: US 8,916,638 B2
(45) Date of Patent: Dec. 23, 2014

(54) CLAY AEROGEL-BASED POLYMER COMPOSITES, MATERIALS AND METHODS

(75) Inventors: David A. Schiraldi, Shaker Heights, OH (US); Matthew D. Gawyrla, Port Matilda, PA (US); Suneel A. Bandi, Lakewood, OH (US)

(73) Assignee: Case Western Reserve University, Cleveland, OH (US)

( * ) Notice: Subject to any disclaimer, the term of this patent is extended or adjusted under 35 U.S.C. 154(b) by 648 days.

(21) Appl. No.: 11/713,189

(22) Filed: Mar. 2, 2007

(65) Prior Publication Data
US 2007/0208124 A1 Sep. 6, 2007

Related U.S. Application Data

(60) Provisional application No. 60/778,213, filed on Mar. 2, 2006.

(51) Int. Cl.
*C08L 1/02* (2006.01)
*C08L 3/02* (2006.01)
*C08L 5/06* (2006.01)
*C08L 5/08* (2006.01)
*C08L 29/04* (2006.01)
*C08K 9/08* (2006.01)
*C08K 3/34* (2006.01)
*C08L 97/02* (2006.01)
*C08L 97/00* (2006.01)

(52) U.S. Cl.
CPC ... *C08K 9/08* (2013.01); *C08L 3/02* (2013.01); *C08L 1/02* (2013.01); *C08L 5/08* (2013.01); *C08L 97/02* (2013.01); *C08L 29/04* (2013.01); *C08L 97/005* (2013.01); *C08K 3/346* (2013.01); *C08L 5/06* (2013.01)
USPC .......................................... 524/445; 428/454

(58) Field of Classification Search
CPC ............... F26B 5/06; C08L 1/02; C08L 3/02; C08L 5/06; C08L 5/08; C08L 29/04; C08L 97/005; C08K 9/08; C08K 3/346
USPC .......................................... 524/445; 428/454
IPC ..................................................... A01K 1/015
See application file for complete search history.

(56) References Cited

U.S. PATENT DOCUMENTS 2,093,454 A 9/1937 Kistler
3,188,264 A * 6/1965 Holden .......................... 206/584
(Continued)

FOREIGN PATENT DOCUMENTS

JP 63159269 A * 7/1988
JP 09238588 A * 9/1997
(Continued)

OTHER PUBLICATIONS

Definition of freeze-drying. Hawley's Condensed Chemical Dictionary, 14th Edition. © 2002. John Wiley & Sons, Inc. 1 page.*

(Continued)

*Primary Examiner* — Brieann R Fink
(74) *Attorney, Agent, or Firm* — Renner, Otto, Boisselle & Sklar, LLP

(57) ABSTRACT

Clay aerogel polymer composites, formed from various types of clay and (co)polymers, which are relatively low density materials having myriad applications. Numerous methods for preparing the clay aerogel polymer composites are disclosed. In a preferred embodiment, the clay aerogel polymer composites are formed using a freeze-drying process. Structures and compositions including the clay aerogel polymer composites are also described. In a preferred embodiment, the clay aerogel polymer composites are derived from a clay, polymer and binder component that provides the composite with increased toughness and durability. Ceramic structures derived from the composites are also described.

20 Claims, No Drawings

(56) References Cited

U.S. PATENT DOCUMENTS

| | | | |
|---|---|---|---|
| 3,203,903 A | | 8/1965 | Van Olphen |
| 4,925,603 A | * | 5/1990 | Nambu ............................ 264/28 |
| 5,176,108 A | | 1/1993 | Jenkins et al. |
| 5,214,012 A | * | 5/1993 | Suzuki et al. .................... 502/62 |
| 5,347,950 A | | 9/1994 | Kasbo et al. |
| 5,503,111 A | | 4/1996 | Hughes |
| 5,526,771 A | * | 6/1996 | Ito ................................. 119/172 |
| 5,622,693 A | * | 4/1997 | Funatsu .......................... 424/69 |
| 5,801,116 A | * | 9/1998 | Cottrell et al. ................. 502/404 |
| 5,975,019 A | | 11/1999 | Goss et al. |
| 5,992,351 A | | 11/1999 | Jenkins |
| 6,083,619 A | * | 7/2000 | Frank et al. .................... 428/331 |
| 6,262,162 B1 | * | 7/2001 | Lan et al. ....................... 524/445 |
| 6,287,550 B1 | | 9/2001 | Trinh et al. |
| 6,811,602 B2 | | 11/2004 | Beppu et al. |
| 6,863,924 B2 | * | 3/2005 | Ranganathan et al. ........ 427/243 |
| 6,887,570 B2 | | 5/2005 | Greene et al. |
| 7,119,137 B2 | * | 10/2006 | Darlington et al. ........... 524/445 |
| 2004/0033352 A1 | * | 2/2004 | Massa et al. ................... 428/323 |
| 2005/0005869 A1 | | 1/2005 | Fritter et al. |
| 2005/0175577 A1 | | 8/2005 | Jenkins et al. |
| 2005/0266992 A1 | * | 12/2005 | Ohno et al. .................... 502/439 |

FOREIGN PATENT DOCUMENTS

| | | | | |
|---|---|---|---|---|
| JP | 11079860 A | * | 3/1999 | |
| JP | 11188253 A | * | 7/1999 | |
| JP | 11347401 A | * | 12/1999 | |

OTHER PUBLICATIONS

Machine translated English equivalent of JP 11188253 A.*
Abstract of Hsu (Effect of Yam (*Dioscorea alate* Compared to *Dioscorea japonica*) on Gastrointestinal Function and Antioxidant Activity in Mice. Journal of Food Science, 2006, 71, S513-S516).*
Machine translated English equivalent of JP 09238588 A.*
Machine translated English equivalent of JP 11079860 A.*
Miller et al. (Notes Random Powder Mounts From Montmorillonite Aerogels. Clay Minerals (1970) 8, 347-348).*
Machine translated English equivalent of JP 11347401 A (14 pages).*
JP 63159269 A as abstracted by CAPlus (AN 1989:12491), 1 page.*
Schiraldi, David A. et al., "Facile Processing of Clays into Organically-Modified Aerogels", AICHE Journal Sep. 30, 2002, Revised Sep. 1, 2005, pp. 1-27.
Schiraldi, David A. et al., "Temperature-Responsive Clay Aerogel Polymer Composites", presented at Case Western Reserve University, Sep. 9, 2005, pp. 1-19.
Schiraldi, David A., "Clay Aerogel Nanocomposites, 'AeroClay'", Clay Aerogel Business Proposal, Sep. 15, 2005, pp. 1-5.
Bandi, Suneel and Schiraldi, David A., "Responsive Polymer/Clay Aerogel Composites", MRS 2004 Presentation, Nov. 24, 2004, 1 pg.
Schiraldi, David A., "Clay Aerogel/Polymer Composites", Schiraldi Research Group, Case Western Reserve University, SPE Online, Sep. 28, 2005.
Schiraldi, David A. et al., "Polymer/Clay Aerogel Composites", American Chemical Society 228$^{th}$ National Meeting & Exposition, Aug. 22-26, 2004, Philadelphia, PA, pp. 32.
Bandi, Suneel et al., "Clay Aerogel Polymer Composites", American Chemical Society, Mar. 8, 2005, 26 pages.
Schiraldi, David A., "Tailoring Polymer Properties Using Well-Designed Nanofillers", Presented at Ferro Corporation Meeting Mar. 29, 2005, 33 pages.
Schiraldi, David A., "Clay Aerogel/Polymer Composites", presented at ANTEC, Boston, MA, May 4, 2005, 40 pages.
Schiraldi, David A., "New Fillers for FR Plastics", presented at Delphi Packard Electric Meeting, Jun. 23, 2005, 30 pages.
Schiraldi, David A., "Polymer/Aerogel Composites for Lightweighting Applications", presented to Honda, Aug. 2, 2005, 37 pages.
Schiraldi, David A., "Case Aerogel Program" presented at NASA Meeting, Jul. 5, 2005, 28 pages.
S. S. Kistler, "Coherent Expanded Aerogels", J. Phys. Chem. 1932; 36: 52-64.
R. C. MacKenzie, "Clay-water Relations", Nature 1952: 171: 681-3.
Hoffman et al. "A Thixotropy in Kaolinite and Inner-Crystalline Swelling in Montmorillonite", Kolloid-Z, 1957; 151, 97-115.
K. Norrish et al., "Effect of Freezing on the Swelling of Clay Minerals", Clay Miner, Bull. 1962; 5: 9-16.
H. Van Olphen, "Polyelectrolyte Reinforced Aerogels of Clays-Application as Chromatographic Adsorbents", Clay Miner, 1967; 15: 423-35.
Nakazawa et al., "Texture Control of Clay-Aerogel Through the Crystallization Process of Ice", Clay Sci. 1987; 6: 269-76.

* cited by examiner

US 8,916,638 B2

CLAY AEROGEL-BASED POLYMER COMPOSITES, MATERIALS AND METHODS

CROSS-REFERENCE

This application claims the priority filing date of U.S. Provisional Application Ser. No. 60/778,213 filed Mar. 2, 2006, herein fully incorporated by reference.

FIELD OF THE INVENTION

The present invention relates to clay aerogel polymer composites, formed from various types of clay and (co)polymers, which are relatively low density materials having myriad applications. Numerous methods for preparing the clay aerogel polymer composites are disclosed. In a preferred embodiment, the clay aerogel polymer composites are formed using a freeze-drying process. Structures and compositions including the clay aerogel polymer composites are also described. In a preferred embodiment, the clay aerogel polymer composites are derived from a clay, polymer and binder component that provides the composite with increased toughness and durability. Ceramic structures derived from the composites are also described.

BACKGROUND OF THE INVENTION

Various types of clays are widely available around the world. Some types of clays are layered or smectic clays that can be subdivided into individual layers. Such clays have been used in an attempt to reinforce polymers. Through some combination of mechanical reinforcement and selected crystallization of thermodynamically disfavored forms of the polymers, significantly enhanced thermal and/or mechanical properties are obtained when compared to the unfilled starting polymers or their more traditionally filled composites. In most cases, however, clay reinforcement of polymers does not result in property enhancement. One reason for sub-par performance is that to achieve useful exfoliation of the clay, the favorable thermodynamics which led to the clay's formation in nature must be overcome, and few polymer systems can provide such a thermodynamic driving force.

In an attempt to provide materials with beneficial properties, inorganic materials such as silicas, clays, metal oxides and the like have been formed into aerogels.

The production of inorganic aerogels from silica and water was first reported by S. S. Kistler, see "Coherent Expanded Aerogels", J. Phys. Chem. 1932; 36: 52-64. In this initial process, water was slowly removed from an aqueous silica mixture via a solvent exchange process using ethanol or ether to produce low density structures. The preparation of montmorillonite clay aerogels by freeze-drying clay hydrogels was reported by R. C. MacKenzie, see "Clay-water Relationships", Nature 1952: 171: 681-3, and F. Call, "Preparation of Dry Clay-Gels by Freeze-Drying", Nature 1953; 172: 126; the resultant fibrous montmorillonite structures were described as possessing reasonable rigidity, but poor thermal stability at 110° C. for extended time or when desiccated over phosphorus pentoxide. Similar processing of non-swelling clays, such as kaolin, only produced fine powders.

Weiss et al., see "The Skeleton Structure in Thixotropic Gels", Naturwissenschaften 1952; 39: 351-2, and Hoffman et al., see "A Thixotropy in Kaolinite and Inner-Crystalline Swelling in Montmorillonite", Kolloid-Z; 1957, 151, 97-115, studied several clay-solvent combinations that produced rapid setting, thixotropic gels. These authors demonstrated that high vacuum sublimation of frozen thixotropic clay gels in water or benezene produced "gel skeletons" with remarkable elasticity (elastic compression up to 75% of their original volumes). Montmorillonite interlayer spacings, measured by x-ray diffraction, were shown to inversely correlate thixotropic and sedimentation volumes. Weiss proposed that high thixotropic volumes of montmorillonite solutions containing alkali ions were caused by a splitting of the montmorillonite crystal into thin layers.

The effects of freeze-drying on the interlayer spacing of clay hydrogels was studied in greater depth by K. Norrish et al, see "Effect of Freezing on the Swelling of Clay Minerals", Clay Miner, Bull. 1962; 5: 9-16. Although montmorillonite clay hydrogels were found to retain their shape and partial rigidity when water was removed the interlayer spacing in sodium montmorillonite decreased from greater than 30 to 10 Å during freezing. Upon thawing, the original clay morphology was restored. Ice crystal formation was thought to be responsible for the collapse of the swollen structure, thus defining a mechanism for structural transformation, but the structure of the gel itself remained elusive.

H. Van Olphen, "Polyelectrolyte Reinforced Aerogels of Clays-Application as Chromatographic Adsorbents", Clay Miner, 1967; 15: 423-35, proposed that particles within clay aerogels, produced using a freeze-drying process, are linked edge-to-face much like a "house of cards" owing to opposite surface and edge charges that exist in clays. The author suggested ice crystals grow radially, pushing clay particles aside to promote parallel platelet alignment. The incorporation of polyelectrolytes into bentonite clay aerogels via freeze-drying of a polyelectrolyte-bentonite hydrogel was also studied by Van Olphen, who found the normally fragile aerogels to become stronger and tougher upon polyelectrolyte incorporation.

The effects of process parameters, such as clay concentration and freezing rates, upon the size and shape of resultant clay aerogels was investigated by Nakazawa et al., see "Texture Control of Clay-Aerogel Through the Crystallization Process of Ice", Clay Sci. 1987; 6: 269-76, who reported that decreases in clay concentrations and freezing rates resulted in pore shape changes from polygonal cells to thin lenses. The authors proposed that pores remaining in the freeze-dried aerogel structure are "negatives" of the ice particles once formed and later sublimed. The aerogels produced by Nakazawa were reportedly stable to heat treatment up to 800° C., albeit with some shrinkage.

U.S. Pat. No. 2,093,454 to Kistler relates to reported improvements in the art and process of producing dry gels from colloidal solutions, and to the production of a gel, one continuous phase of which is a gas, and which Kistler defines as an aerogel. Kistler states that the aerogels are characterized by the fact that they are formed from colloidal gels in which the liquid menstruum is removed, at least in part, by heating the liquid under pressure beyond its critical temperature, and subsequently releasing the liquid thus heated. In this manner it is possible to produce a skeleton of the solid component of the gel as it actually exists before treatment and differing only in that the liquid medium is displaced by a vapor or gas.

U.S. Pat. No. 3,203,903 to Van Olphen et al. relates to inorganic aerogels characterized by reportedly substantial physical stability and to a process for preparing such aerogels. Van Olphen reportedly teaches a method for preparing physically stable, mechanically strong aerogels of inorganic materials. The method comprises forming a gel of the inorganic material in which there is uniformly and intimately admixed a polymeric material which has substantial solubility in the liquid which composes the dispersing medium of the gel, then removing the dispersing medium and replacing it with a noncondensable gas phase, under conditions such that no gas-liquid interface exists in the dispersing medium during its removal. The aerogels of inorganic materials prepared in this way reportedly have been found to have substantially greater mechanical strength than the aerogels of the same inorganic materials prepared by the methods known previously. It has reportedly been found, for example, that clay aerogels, which have little physical strength when prepared according to the prior art methods, when prepared according to the process of this invention can readily be formed into different shapes and are physically strong enough to retain those shapes when subjected to physical stresses encountered during their use. This invention reportedly provides inorganic aerogels of improved strength. Van Olphen only describes the use of a polymeric material that can be introduced into a precursor gel used to form an aerogel. Column 4, lines 15-33, state that the polymeric material can be first dissolved in a liquid to be used in forming the gel and then the gel formed, or the gel can be formed, then contacted with a solution of the polymeric material in that liquid, or in a different liquid. The inventors of the present application have found that the aerogel composites produced according to the teachings of Van Olphen are relatively fragile, and typically fall apart upon handling.

As such, there is a need in the art for aerogel materials having improved physical features over that of a clay aerogel whose mechanical properties are marginal.

SUMMARY OF THE INVENTION

Clay aerogel polymer composites are formed according to the present invention. The composites utilize layered or smectic type clays capable of being exfoliated or sub-divided into individual layers. Many different types of monomers, polymers or copolymers can be utilized to form the composite in conjunction with the clay utilized.

Many different methods can be utilized to convert clays and polymers, copolymers or monomers into useful clay aerogel polymer composite materials. For example, in one embodiment the clay aerogel polymer composite can be produced from a solution, producing the composite in a single step. In one embodiment, the composite formed is derived from a clay, polymer and binder component. In a further embodiment, the aerogel structure can be preformed from a clay solution and a polymer dissolved in a suitable solvent can be infused into the aerogel, followed by freeze-drying to form the clay aerogel polymer composite. In yet a further embodiment, polymers can be melt processed with the aerogel to form a clay aerogel polymer composite material. In still another embodiment, monomers can be infused into the aerogel structure or aerogel precursor, and then in-situ polymerized in the presence of a binder to form a clay aerogel polymer composite.

Numerous different articles can be prepared containing the composite material. The articles listed herein include, but are not limited to, small, free-flowing particles (typically, but not limited to, about 1 to about 3 inches in length, and of many different shapes) suitable for use as a packaging material which represents an alternative to expanded polystyrene particles commonly in use at the present time. Also included are single molded parts or forms suitable for packaging of electronic components and other items similar to and as a replacement for the polystyrene foam inserts which computers or other devices come packed in. Molded parts, organized bats or free-flowing particles suitable for thermal and/or acoustical insulation, including, but not limited to, housing (walls, attic, roofing structures, pipes and ductwork), vehicles such as sound deadening panels or foams, and aircraft and spacecraft exterior and interior insulation panels are able to be prepared. Articles suitable for providing barrier to gas or liquid permeation beyond that of a simple polymeric structure and can be used in a variety of packaging and storage devices are able to be prepared. Articles suitable for providing ballistic protection, suitable for use in individual body armor, as well has vehicular protection in land, water, or aeronautic forms of transportation can also be prepared. Additional articles include filters or products (pads, bats, and loose fills, etc.) used to absorb industrial, biological, chemical, agricultural wastes and other fluids. Other, low density polymeric structures in which the clay aerogel composite is present can be used to replace polymeric foams. Laminates including the clay aerogel composite are prepared in some embodiments.

Accordingly, one aspect of the invention is to provide a clay aerogel polymer composite, comprising a clay, a (co)polymer, and a binder component, wherein the clay is present in an amount from about 1 to about 99 parts per 100 parts by weight of the composite, wherein the polymer is present in an amount from about 1 to about 99 parts by weight per 100 parts by weight of the composite, and wherein the binder component is present in an amount from about 0.1 to about 40 parts by weight per 100 parts by weight of the composite.

Another aspect of the invention is to provide a process for preparing a clay polymer aerogel composite, comprising the steps of combining a clay, a (co)polymer, a binder component and a solvent to form a composition, freezing the composition, and sublimating the composition to remove the solvent and produce the clay aerogel polymer composite.

Yet another aspect of the invention is to provide a clay aerogel polymer composite, comprising the composite derived from a composition comprising a) an aerogel derived from at least clay; b) a (co)polymer; and c) a binder component, wherein the binder component is present in the composite either before or after the aerogel is contacted with the (co)polymer.

Still another aspect of the invention is a process for preparing a clay aerogel polymer composite, comprising the steps of combining an aerogel derived from at least clay with a (co)polymer melt or solution, wherein a binder component is present in the aerogel or the melt or solution, or both prior to said combining step.

A further aspect of the invention is a clay aerogel polymer composite, comprising the composite derived from a) an aerogel derived from at least clay, b) two or more monomers that are the same or different, c) an initiator, and d) a binder component, and optionally a cross-linker, wherein the monomers are polymerized in the presence of the clay aerogel.

Another aspect of the invention is a process for preparing a clay aerogel polymer composite, comprising the steps of a) combining an aerogel derived from at least clay, b) two or more same or different monomers, c) an initiator, and d) a binder component in a solvent to form a solution; and polymerizing the monomers and removing the solvent to produce the clay aerogel polymer composite.

Still a further aspect of the invention is a ceramic aerogel, comprising a ceramic structure derived from an aerogel composition formed by heating to a temperature greater than or equal to 400° C. for a length of time sufficient to produce the ceramic aerogel.

Yet another aspect of the invention is a process for preparing a ceramic aerogel, comprising providing an aerogel, heating the aerogel for a sufficient period of time to a temperature above 400° C. to produce the ceramic aerogel.

A further aspect of the invention is an article, comprising a clay aerogel polymer composite layer and a second layer.

Yet a further aspect of the invention is a clay aerogel composite, comprising a clay, and a water soluble salt in an amount from about 0.05 to about 20 parts by weight per 100 parts by weight of the clay.

DETAILED DESCRIPTION OF THE INVENTION

The clay aerogel polymer composites of the invention are at least derived from a composition comprising a clay and a (co)polymer derived from one or more same or different monomers. Thus, the term polymer in clay aerogel polymer composites can refer to a polymer or copolymer, unless specifically stated otherwise. In various preferred embodiments, the composites include a binder component that generally adds or contributes, i.e. such as synergistically, beneficial properties to the composites. The clay aerogel polymer composites are low density materials possessing useful properties capable of numerous different uses.

The clays utilized to form the clay aerogel polymer composites of the present invention are layered or smectic clays capable of being exfoliated or subdivided into individual layers. Clay is generally defined as a material containing a hydrated silicate of an element such as aluminum, iron, magnesium, potassium, hydrated alumina, iron oxide, or the like. The silicate layers of such clays are negatively charged, and are separated by layers of positively charged ions, such as sodium, potassium and other elements. While not specifically required for the present invention, naturally-occurring clays can be altered via ion exchange processes, to, for example, replace sodium ions with quaternary ammonium ions and utilized in the present invention. Occasionally, the clay will contain impurities of other naturally occurring minerals and elements that can vary depending on the location where the clay is obtained. The clays of interest for the present invention can be used as mined, or can be purified by methods known to those of ordinary skill in the art of clay product manufacture.

Examples of suitable clays, which generally should be soluble or dispersible in solvents such as water to at least 1-5 wt. %, include, but are not limited to, illite clays such as attapulgite, sepiolite, and allophone; smectite clays such as montmorillonite, bentonite, beidellite, nontronite, hectorite, saponite, and sauconite; kaolin clays such as kaolinite, dickite, nacrite, anauxite, and halloysite-endellite. The smectic clays are preferred as the same include a preferred layered structure.

Various types of monomers, polymers, or copolymers can be combined with the clays described herein to form the clay aerogel polymer composites of the present invention. Both water soluble and non-water soluble polymers can be utilized and are each preferred in different embodiments and end use applications. As described herein, various monomers can be polymerized in the presence of a clay aerogel or a clay itself to form a clay aerogel polymer composite.

Examples of water soluble polymers include, but are not limited to, natural polymers such as starches, plant gums, modified cellulosic and lignin materials, chitan, chitosan, pectin, and water soluble and dispersible proteins. Suitable starches comprise corn starch, potato starch, amaranth starch, arrowroot starch, banana starch, barley starch, cassava starch, millet starch, oat starch, rice starch, rye starch, sago starch, sorghum starch, sweet potato starch, wheat starch and yam starch.

Water soluble polyelectrolyte polymers can also be used. Suitable polyelectrolytes have more than one acidic group per molecule. By acidic group is meant not only the acid moieties such as the sulfonic acid group, the carboxyl group, the various phosphorus acid groups, phenol groups and the like, but also their salts with both monovalent and polyvalent metals, with ammonia, and with such other salt-forming groups as the various phosphonium and sulfonium groups, and also their esters. Suitable polyelectrolytes include those wherein all of the acidic groups are combined as salts and those wherein but a part of the acidic groups are combined as salts. The suitable polyelectrolytes of this type are generically described as water-soluble organic polymeric polyelectrolytes having a molecular weight of at least 10,000. Several classes of polyelectrolytes are well known. One class is that in which the polyelectrolyte is thermoplastic—that is, the class of polyelectrolytes which are substantially free from cross-linking, or potentially cross-linking, structures. The two best known subclasses of this class are wherein the essential structure is a chain of carbon atoms, acidic groupings being substituted to that chain, and those wherein the essential structure is a chain of rings, as in cellulose derivatives wherein the ring structures are cellobiose structures. Another class of genus is that which is known as the corpuscular proteins, the chief subclass being the albumins.

Examples of this subclass wherein the essential structure of the polymer is a chain of carbon atoms are the copolymers of maleic anhydride, maleic acid, salts of maleic acid, and maleic amides with any copolymerizable monoolefinic monomer, such as vinyl acetate, vinyl alkyl ethers, vinyl chloride, and isobutylene, particularly the alkali metal, ammonium and alkaline earth metal salts of said copolymers. Such polymers are described in detail in U.S. Pat. No. 2,652,323, herein incorporated by reference.

Additional polymers or copolymers that can be utilized in the present invention are derived from monomers, including, but not limited to, olefin monomers such as ethylene, propylene, 1-octene and other alpha-olefins, styrene, isoprene, butadiene and cyclic olefins, halogenated monomers such as vinyl chloride, chlorinated isoprene and vinyl or vinylidene fluoride, acrylic monomers such as acrylic acid, methacrylic acid, acrylonitrile and various acrylate and acrylamide monomers, polyamides derived from amine containing monomers, vinyl acetate, aliphatic and aromatic dialcohols, diamines, diisocyanates or dicarboxylic acids, as well as difunctional monomers such as those containing one carboxylic acid and either one alcohol or amino group, various arylene oxides, arylene sulfides or arylene sulfones, monomers having one or more epoxy groups, including but not limited to, glycidyl ether- and cyclohexane oxide-containing monomers. Also included are any of the above-listed, or similar polymers which have been modified to include polyfunctional monomers (having three or more polymerizable functional groups) capable of polymer chain branching or crosslinking. The subject polymers can be thermoplastic, thermoset, or can be thermosettable—i.e. treated with heat, radiation or chemical agents after formation of the composite structure in such a manner that the polymer is rendered thermoset after said treatment.

As described herein, in one embodiment of the present invention, two or more of the same or different monomers which are utilized to form the above described polymers or copolymers are dissolved in a suitable polymerization medium along with one or more desired clays and preferably a binder component, and the monomers are polymerized. In such cases, the composition in one embodiment includes an initiator, such as a free radical initiator and optionally a crosslinker. Suitable free radical initiators include, but are not limited to, azo compounds such as 2,2'-azobisisobutyronitrile, 4,4'-azobis(4-cyanovaleric acid), and 1,1'-azobis(cyclohexane-carbinitrile); peroxides such as benzoyl peroxide, tert-butyl peroxide, and tert-butyl hydroperoxide; Fenton's Reagent, and benzophone or other photo-initiated agents. Suitable crosslinking agents include, but are not limited to, 1,3,5-benzene tricarboxylic acid, 1,2,4 benzene tricarboxylic acid anhydride, glycerol, pentaerythritol, a polyamine such as triethylene tetramine, divinyl benzene, multifunctional isocyanates, and ethylene glycol bis(methacrylate).

Other fillers such as, but not limited to, non-smectic clays, talc, mica, glass fibers, carbon fibers, and carbon nanotubes can be incorporated in an amount up to 50 parts by weight per 100 parts of the aerogel polymer composite composition on a dry basis, preferably less than 10 parts per hundred. Colorants (dyes, pigments), antistatic agents, chemical coupling agents, electrically conductive-fillers including, but not limited to, forms of conductive carbon and metal flakes/particles; and photoactive species including, but not limited to, rare earth ions, can each be incorporated into the aerogel composite structures, generally at less than 10 parts per hundred parts of the aerogel polymer composite, and in some cases at less than 1 part per million of the final composition by weight.

Non-water soluble polymers are preferably dissolved in a suitable solvent appropriate for the polymer with examples including, but not limited to, alcohol such as methanol, ethanol, propanol, butanol, acid group containing solvents such as formic acid and acetic acid, formamide, acetone, tetrahydrofuran, methyl ethyl ketone, ethyl acetate, acetonitrile, N,N-dimethylformamide, dimethyl sulfoxide, hexane, toluene, benzene, ethers such as diethyl ether, methylene chloride, or carbon tetrachloride, etc.

The aerogel polymer composites of the present invention include clay in an amount generally from about 1 to about 99 parts, desirably from about 1 to about 40 parts, and preferably from about 1 to about 10 or 30 parts by weight based on 100 parts by weight of the aerogel polymer composite. Unless specifically stated herein, all parts are on a dry weight basis, i.e. no water or solvent, etc. The weight ratio of polymer to clay ranges generally from 1:99 to about 99:1, desirably from about 1:9 to about 9:1, and preferably from about 1:4 to about 4:1 polymer to clay. That said, the polymer is present generally in an amount from about 1 to about 99 parts, desirably from about 1 to about 60 parts, and preferably from about 1 to about 30 parts based on 100 parts by weight of the aerogel composite. The balance of the aerogel composite comprises any of the binder component, additives, fillers, etc. such as mentioned hereinabove.

In a further embodiment, in addition to the clay and polymer components, the aerogel compositions and composites formed from the compositions include a binder component that provides the composites with additional desirable properties, such as mechanical properties and water absorption properties. In one embodiment, the binder component is a polymer or copolymer derived from two or more same or different alkylene oxide monomers having from 2 to about 6 carbon atoms, such as ethylene oxide, propylene oxide, and butylene oxide. Examples of suitable preferred binder components include, but are not limited to, poly(vinyl alcohol), poly(ethylene oxide), poly(propylene oxide), and poly(ethylene oxide)/(propylene oxide) (co)polymers. These (co)polymer components can also be derived from amines, such as (but not limited to) poly(ethylene imine) and can include mixed polymer systems which are composed of greater than one functionality, such as amines and alkylene oxides. An examine such a mixed system is a poly(alkylene oxide) which has amine groups at its ends—such amine/poly(alkylene oxide) materials are commercially available as surfactants. The binder component is present in the aerogel composite in an amount generally from about 0.1 to about 40 parts, desirably from about 0.5 to about 25 parts, and preferably from about 1 to about 10 parts by weight per 100 parts by weight of the aerogel polymer composite.

In yet a further embodiment, any water soluble salt, comprising mono-, di-, or tri-valent cations, including, but not limited to, Na, K, Li, H, Ca, Mg, and Al, and mono-, di-, or tri-valent anions, including, but not limited to, Cl, F, Br, O, S, $PO_4$, $SO_3$, $SO_4$, acetate, or benzoate, or combinations thereof are incorporated into the aerogel or aerogel polymer composite. These salts are preferably incorporated into the aqueous clay gel mixtures prior to freeze drying and are present in an amount from about 0.05 to about 10 or about 20 parts per 100 parts by weight of the clay aerogel or aerogel polymer composite on a dry basis, depending on the specific solubility of said salts.

These salt-modified aerogels can be produced in the presence or absence of water soluble or water dispersible polymers, and/or sizing agents. The composites produced can be used as is, or can be subjected to one or more subsequent modification steps including, but not limited to, impregnation with polymer or monomer solutions, and heat treatment to produce ceramic material.

Many different methods can be utilized to convert clays and polymers, copolymers or monomers, and optionally, but often preferably a binder, into useful clay aerogel polymer composite materials.

For example, in one embodiment the aerogel composite can be produced from a polymer solution, producing the clay aerogel polymer composite in a single step. Forming a clay aerogel polymer composite in a single step offers numerous benefits including, shortened production time compared with alternative methods, as well as producing composites having property differences such as by being able to produce a more resilient, foam-like material, when compared to a two-step method. In the process, a desired amount of clay, a polymer, and a binder component are utilized to form a clay aerogel polymer composite in a single-step per se. In a preferred embodiment, a natural polymer such as and preferably a starch is combined with a binder component, such as and preferably poly(vinyl alcohol) and/or poly(ethylene oxide). A general method for forming the composite is as follows.

In a preferred single-step method embodiment, a clay, such as montmorillonite, is mixed with a polymer, such as cornstarch by any suitable method for a period of time and then added to a solvent in which the polymer is soluble. A desired amount of a binder component is added and mixed with the clay and polymer in a preferred embodiment. For example, when cornstarch is used as a polymer, water, preferably deionized water, can be utilized as a solvent. Generally from about 1-30 wt. % solids in water is utilized. Any solvent that can be frozen into a crystalline ice, then sublimed can be used. Benzene is a representative example of a solvent other than water than can be used in other embodiments. The clay polymer solvent mixture is mixed for a period of time generally until the polymer is suspended or dissolved in the solution. In one embodiment, the solvent is heated to increase solubility of the polymer and/or binder component. The solution is blended and sheared for a period of time, such as from about 5 minutes to about 120 minutes until desired suspension is achieved. In one embodiment, a single speed blender can be utilized, such as one available from Waring. The solution is then poured or otherwise transferred into a mold. The solution in the mold is then frozen. In a preferred embodiment, the solution is frozen utilizing liquid nitrogen, although the liquid nitrogen does not contact the solution. After the solution is frozen, the mold is transferred to a freeze dryer and dried for a suitable period of time to remove the solvent. The clay aerogel polymer composite is then removed from the mold.

An example of the one step method is as follows. A clay aerogel cornstarch polymer composite including a polyvinyl alcohol binder material was formed. 3.5 g sodium exchanged montmorillonite (PGW, Nanocor), 1.25 g polyvinyl alcohol (MW=108,000 g/mol, Polysciences Inc.), 1.25 g of corn starch (Tops Market) and 100 mL of deionized water were utilized. The polyvinyl alcohol was dissolved first in the deionized water at 100° C. and then allowed to cool to around room temperature. Then the clay/starch mixture was added to the room temperature polymer solution. The mixture was stirred by hand using a glass stir rod until all of the dry powder was suspended or dissolved in the solution. The solution was then transferred to a single speed Waring laboratory blender and sheared for 1 minute. The sheared solution was poured into glass vials (Fischerbrand, 4 DR) and frozen by submersion, up to the level of the solution, in liquid nitrogen. The vials were removed from the liquid nitrogen and placed in lyophilization shells and freeze dried for 36 hours. The dried composite was then removed by inverting the vial. Typical bulk density of the clay aerogel polymer composite is in the range of 0.04-0.07 g/cm3.

One example of forming an aerogel including a water soluble salt follows. A single speed Waring laboratory blender fitted with 1.25 L glass vessel contained 100 ml of solution containing 2 g of Closite Na+® clay and NaCl varying from 0.05 g to 1 g dispersed in 100 ml of water. This solution was sheared using a stainless steel rotor blade assembly. The mixture was blended 5 minutes, and then transferred to 600 mL freeze dryer shell. A Virtis Freeze Mobile 35EL freeze-dryer was used to sublime frozen clay hydrogels over 24 hours. Thus, after 24 hours an aerogel structure was formed. When the above experiment was conducted using 1 g NaCl, the resultant aerogel exhibited a bulk density of 0.03 g/cc. This aerogel structure was noticeably denser and firmer to the touch than the equivalent material produced in the absence of NaCl in the preparation gel solution. When examined by scanning electron microscopy, it was also observed that the spacing between layers of clay within the aerogel produced with NaCl was noticeably less than is obtained in the absence of that salt, consistent with the higher bulk density.

In a further embodiment, the clay aerogel polymer composite is formed from an aerogel preformed from a clay solution, with the aerogel being infused with a polymer in a second step from a polymer solution. In yet a further embodiment, polymers can be melt processed with the preferred aerogel to form the composite material. In still another embodiment, monomers and a binder can be infused into the aerogel structure, and then the monomers in-situ polymerized to form a clay aerogel polymer composite. In a preferred embodiment, the composites formed from aerogel and polymer include a binder component.

In a first step, a clay aerogel is formed. One method for forming the aerogel is as follows. Other methods for forming clay aerogels have been set forth in the prior literature. A clay is dissolved or dispersed in an appropriate medium such as, but not limited to, water, preferably with mixing for a predetermined period of time. Generally, the mixture is mixed until the clay is hydrated or swelled. The clay medium mixture is transferred to an appropriate mold or vessel. Afterwards, the mixture is freeze dried generally from about 4 to about 48 hours to produce the clay aerogel. The critical point for water lies at 4.58 Torr and 0.0098° C. and below this pressure and temperature, ice is sublimed into vapor. Thus, when water is utilized as a solvent, temperature at least under 0° C. and pressure under 4.58 Torr are utilized. In one embodiment, a freeze drying system with a temperature of −35° C. under a vacuum of about 100 millitorr vacuum is utilized.

In a second step, the aerogel composite is formed by combining the aerogel with a polymer and optionally a binder. In one embodiment, the formed aerogel is soaked or immersed, or the like in a polymer melt or solution for a period of time to, optionally in the presence of a solvent such as water. The solvent, if present, is subsequently removed by evaporation or the like.

An example is as follows. 1 g of clay was dispersed in 50 ml water to which 50 ml of 5 wt. % aqueous polyvinyl alcohol solution was added. The solution is then freeze dried (at −35° C., 100 millitorr) within a cylindrical mold, and the resulting aerogel composite (A) was removed from the mold. In a beaker, 1 g of poly(ethylene glycol) (PEG) Mn~20,000 was dissolved in 50 ml water. The previously prepared composite (A) was infused with PEG by subsequent soaking of (A) in the solution of PEG and evaporating the water under vacuum to result in composite (B); this composite consisted of an intimate combination of clay aerogel and PVA, then encapsulated in PEG. The composite produced in this manner was subjected to ordinary handling without damage, and demonstrates the ability to produce a composite with two distinct polymers present in structurally-different environments within the composite.

In a further embodiment, a clay aerogel polymer composite is produced from a clay aerogel or clay polymer aerogel such as a clay corn starch aerogel composite and an additional polymer formed in-situ from two or more same or different monomers and a binder component. In a first step, the desired monomers and binder component are dissolved in a suitable solvent to form a solution. A desired amount of clay aerogel is added to the solution. An effective amount of a free radical initiator, and optionally a crosslinking agent is/are added to the solution. The solution is heated to a suitable temperature in order to cause polymerization of the monomers as known in the art to produce a clay aerogel polymer composite. The solvent is physically removed from the aerogel structure, for example, by application of a vacuum.

The clay aerogel polymer composite material possesses many desirable properties, such as low density, desirable mechanical strength, and resiliency. The aerogel composites can be utilized alone, such as packaging materials of any desired shape and size, and are alternatives to packaging materials such as expanded polystyrene that are commonly used in the field. Complex molded shapes can also be formed utilizing the aerogel composites which are suitable for packaging of almost any articles, and have particular value in the electronics industry. The aerogel composites can be utilized in a variety of packing and storage devices and utilized for thermal and/or acoustical installation for generally any object. The aerogel composites can be utilized in components in laminates or articles for various uses. Films of the aerogel composites can be combined with other polymer films or layers or objects in one embodiment.

The numerous different types of laminates or articles containing the clay aerogel polymer composites of the present invention are envisioned. For example, in one embodiment the laminates or articles include at least one layer or other structure of a clay aerogel polymer composite and at least a second layer or other structure layer different than the clay aerogel polymer composite. Examples of additional layers include, but are not limited to, frames, films, adhesives, fabrics, molded objects, ceramic forms or the like. The additional layer can be natural or synthetic material such as polymer or copolymer film, natural film such as those made from fibers. Any of the films can be woven or nonwoven, porous or nonporous to various components. The additional layer may include material such as paint, wood, metal and combinations thereof.

In yet a further embodiment of the present invention, aerogel ceramics are contemplated. Clay aerogel or clay aerogel polymer composite ceramics are formed from the aerogels by heating to an elevated temperature for a period of time in order to produce an aerogel ceramic. Structures remain low density (generally less than about 1.0 g/cm$^3$), are mechanically hard, easily handled, and stable to high temperatures of use. The aerogels are generally heated to a temperature above about 400° C. for a period of time to produce the ceramic. In a preferred embodiment, the desired aerogel is placed in a suitable vessel and heated. The heat can be increased by predetermined increments such as about 50° C., 100° C., or 200° C. per hour to a final temperature such as from about 800° C. to about 1200° C., and cooled at one of the above mentioned rates after the ceramic has been formed. Kilns or firing furnaces are known in the art that can be utilized to prepare aerogel ceramics.

An aerogel ceramic was formed in one embodiment as follows. A montmorillonite aerogel with a bulk density of about 0.5 g/cm$^3$ was heated using a propane torch at about 1200° C. for a total of about 25 minutes.

In one embodiment, a clay aerogel polymer composite is disclosed, comprising: the composite derived from a) an aerogel derived from at least clay, b) two or more monomers that are the same or different, c) an initiator, and d) a binder component, and optionally a cross-linker, wherein the monomers are polymerized in the presence of the clay aerogel. In one embodiment, the binder component is polyvinyl alcohol, a polymer or copolymer derived from two or more same or different alkylene oxide monomers having from 2 to about 6 carbon atoms, or a copolymer derived from at least one alkylene oxide having from 2 to about 6 carbon atoms and an amine, or a combination thereof, wherein the initiator is azo compounds, peroxides, Fenton's Reagent, and benzophone or other photo-initiated agents. In another embodiment the clay is present in an amount from about 1 to about 40 parts per 100 parts by weight of the composite, wherein the polymer is present in an amount from about 1 to about 60 parts by weight per 100 parts by weight of the composite, and wherein the binder component is present in an amount from about 0.5 to about 25 parts by weight per 100 parts by weight of the composite. In yet another embodiment the clay is present in an amount from about 1 to about 30 parts per 100 parts by weight of the composite, wherein the polymer is present in an amount from about 1 to about 30 parts by weight per 100 parts by weight of the composite, and wherein the binder component is present in an amount from about 1 to about 10 parts by weight per 100 parts by weight of the composite. In another embodiment the (co)polymer is a water soluble (co)polymer. In a further embodiment the water soluble (co)polymer is a starch, plant gum, modified cellulosic, lignin material, chitan, chitosan, pectin, a water soluble and dispersible protein, or combinations thereof. In yet another embodiment the binder component is polyvinyl alcohol or a polymer or copolymer derived from two or more same or different alkylene oxide monomers having from 2 to about 6 carbon atoms, or a combination thereof. In another embodiment the (co)polymer is derived from two or more same or different monomers comprising an olefin monomer, styrene, isoprene, butadiene, a cyclic olefin, a halogenated monomer, chlorinated isoprene, vinyl fluoride, vinylidene fluoride, acrylic monomer, vinyl acetate, an amine group containing monomer, aliphatic dialcohol, aromatic dialcohol, diamine, diisocyanate, dicarboxylic acid, a difunctional monomer containing one carboxylic acid and either one alcohol or amino group, arylene oxide, arylene sulfide, arylene sulfone, and a monomer having one or more epoxy groups, or combinations thereof. In still another embodiment the (co)polymer is corn starch, potato starch, amaranth starch, arrowroot starch, banana starch, barley starch, cassava starch, millet starch, oat starch, rice starch, rye starch, sago starch, sorghum starch, sweet potato starch, wheat starch or yam starch or combinations thereof. Combinations of the embodiments are envisioned.

In a further embodiment a process for preparing a clay aerogel polymer composite is disclosed, comprising the steps of: combining a) an aerogel derived from at least clay, b) two or more same or different monomers, c) an initiator, and d) a binder component in a solvent to form a solution; and polymerizing the monomers and removing the solvent to produce the clay aerogel polymer composite. In one embodiment the binder component is polyvinyl alcohol, a polymer or copolymer derived from two or more same or different alkylene oxide monomers having from 2 to about 6 carbon atoms, or a copolymer derived from at least one alkylene oxide having from 2 to about 6 carbon atoms and an amine, or a combination thereof. In another embodiment the clay is present in an amount from about 1 to about 40 parts per 100 parts by weight of the composite, wherein the polymer is present in an amount from about 1 to about 60 parts by weight per 100 parts by weight of the composite, and wherein the binder component is present in an amount from about 0.5 to about 25 parts by weight per 100 parts by weight of the composite. In yet another embodiment the clay is present in an amount from about 1 to about 30 parts per 100 parts by weight of the composite, wherein the polymer is present in an amount from about 1 to about 30 parts by weight per 100 parts by weight of the composite, and wherein the binder component is present in an amount from about 1 to about 10 parts by weight per 100 parts by weight of the composite. In yet another embodiment the (co)polymer is a water soluble (co)polymer. In a further embodiment the water soluble (co)polymer is a starch, plant gum, modified cellulosic, lignin material, chitan, chitosan, pectin, a water soluble and dispersible protein, or combinations thereof. In another embodiment the binder component is polyvinyl alcohol or a polymer or copolymer derived from two or more same or different alkylene oxide monomers having from 2 to about 6 carbon atoms, or a combination thereof. In another embodiment the (co)polymer is derived from two or more same or different monomers comprising an olefin monomer, styrene, isoprene, butadiene, a cyclic olefin, a halogenated monomer, chlorinated isoprene, vinyl fluoride, vinylidene fluoride, acrylic monomer, vinyl acetate, an amine group containing monomer, aliphatic dialcohol, aromatic dialcohol, diamine, diisocyanate, dicarboxylic acid, a difunctional monomer containing one carboxylic acid and either one alcohol or amino group, arylene oxide, arylene sulfide, arylene sulfone, and a monomer having one or more epoxy groups, or combinations thereof. In a further embodiment the (co)polymer is corn starch, potato starch, amaranth starch, arrowroot starch, banana starch, barley starch, cassava starch, millet starch, oat starch, rice starch, rye starch, sago starch, sorghum starch, sweet potato starch, wheat starch or yam starch or combinations thereof. Combinations of the embodiments are envisioned.

In a further embodiment a ceramic aerogel is disclosed comprising: a ceramic structure derived from an aerogel composition formed by heating to a temperature greater than or equal to 400° C. for a length of time-sufficient to produce the ceramic aerogel. In another embodiment the aerogel is derived from clay and a (co)polymer or binder component, or combinations thereof. In another embodiment the binder component is polyvinyl alcohol, a polymer or copolymer derived from two or more same or different alkylene oxide monomers having from 2 to about 6 carbon atoms, or a copolymer derived from at least one alkylene oxide having from 2 to about 6 carbon atoms and an amine, or a combination thereof. In a further embodiment the clay is present in an amount from about 1 to about 40 parts per 100 parts by weight of the composite, wherein the polymer is present in an amount from about 1 to about 60 parts by weight per 100 parts by weight of the composite, and wherein the binder component is present in an amount from about 0.5 to about 25 parts by weight per 100 parts by weight of the composite. In yet a further embodiment the clay is present in an amount from about 1 to about 30 parts per 100 parts by weight of the composite, wherein the polymer is present in an amount from about 1 to about 30 parts by weight per 100 parts by weight of the composite, and wherein the binder component is present in an amount from about 1 to about 10 parts by weight per 100 parts by weight of the composite. In a further embodiment the (co)polymer is a water soluble (co)polymer. In a further embodiment the water soluble (co)polymer is a starch, plant gum, modified cellulosic, lignin material, chitan, chitosan, pectin, a water soluble and dispersible protein, or combinations thereof. In yet another embodiment the binder component is polyvinyl alcohol or a polymer or copolymer derived from two or more same or different alkylene oxide monomers having from 2 to about 6 carbon atoms, or a combination thereof. In another embodiment the (co)polymer is derived from two or more same or different monomers comprising an olefin monomer, styrene, isoprene, butadiene, a cyclic olefin, a halogenated monomer, chlorinated isoprene, vinyl fluoride, vinylidene fluoride, acrylic monomer, vinyl acetate, an amine group containing monomer, aliphatic dialcohol, aromatic dialcohol, diamine, diisocyanate, dicarboxylic acid, a difunctional monomer containing one carboxylic acid and either one alcohol or amino group, arylene oxide, arylene sulfide, arylene sulfone, and a monomer having one or more epoxy groups, or combinations thereof. In yet a further embodiment the (co)polymer is corn starch, potato starch, amaranth starch, arrowroot starch, banana starch, barley starch, cassava starch, millet starch, oat starch, rice starch, rye starch, sago starch, sorghum starch, sweet potato starch, wheat starch or yam starch or combinations thereof. Combinations of the embodiments are envisioned.

In a further embodiment a ceramic aerogel is disclosed comprising: providing an aerogel and heating the aerogel for a sufficient period of time to a temperature above 400° C. to produce the ceramic aerogel. In a further embodiment the aerogel is derived from clay and a (co)polymer or binder component, or combinations thereof, wherein the binder component is polyvinyl alcohol, a polymer or copolymer derived from two or more same or different alkylene oxide monomers having from 2 to about 6 carbon atoms, or a copolymer derived from at least one alkylene oxide having from 2 to about 6 carbon atoms and an amine, or a combination thereof. In another embodiment the clay is present in an amount from about 1 to about 40 parts per 100 parts by weight of the composite, wherein the polymer is present in an amount from about 1 to about 60 parts by weight per 100 parts by weight of the composite, and wherein the binder component is present in an amount from about 0.5 to about 25 parts by weight per 100 parts by weight of the composite. In another embodiment the clay is present in an amount from about 1 to about 30 parts per 100 parts by weight of the composite, wherein the polymer is present in an amount from about 1 to about 30 parts by weight per 100 parts by weight of the composite, and wherein the binder component is present in an amount from about 1 to about 10 parts by weight per 100 parts by weight of the composite. In a further embodiment the (co)polymer is a water soluble (co)polymer. In yet another embodiment the water soluble (co)polymer is a starch, plant gum, modified cellulosic, lignin material, chitan, chitosan, pectin, a water soluble and dispersible protein, or combinations thereof. In a further embodiment the binder component is polyvinyl alcohol or a polymer or copolymer derived from two or more same or different alkylene oxide monomers having from 2 to about 6 carbon atoms, or a combination thereof. In another embodiment the (co)polymer is derived from two or more same or different monomers comprising an olefin monomer, styrene, isoprene, butadiene, a cyclic olefin, a halogenated monomer, chlorinated isoprene, vinyl fluoride, vinylidene fluoride, acrylic monomer, vinyl acetate, an amine group containing monomer, aliphatic dialcohol, aromatic dialcohol, diamine, diisocyanate, dicarboxylic acid, a difunctional monomer containing one carboxylic acid and either one alcohol or amino group, arylene oxide, arylene sulfide, arylene sulfone, and a monomer having one or more epoxy groups, or combinations thereof. In yet another embodiment the (co)polymer is corn starch, potato starch, amaranth starch, arrowroot starch, banana starch, barley starch, cassava starch, millet starch, oat starch, rice starch, rye starch, sago starch, sorghum starch, sweet potato starch, wheat starch or yam starch or combinations thereof. Combinations of the embodiments are envisioned.

In a further embodiment an article is disclosed comprising: a clay aerogel polymer composite layer and a second layer. In a further embodiment the second layer is a natural material, a synthetic material, or combinations thereof. In another embodiment the synthetic material is a polymer or (co)polymer film layer. In another embodiment the clay aerogel polymer composite comprises a clay; a (co)polymer; and a binder component, wherein the clay is present in an amount from about 1 to about 99 parts per 100 parts by weight of the composite, wherein the polymer is present in an amount from about 1 to about 99 parts by weight per 100 parts by weight of the composite, and wherein the binder component is present in an amount from about 0.1 to about 40 parts by weight per 100 parts by weight of the composite. In a further embodiment the binder component is polyvinyl alcohol, a polymer or copolymer derived from two or more same or different alkylene oxide monomers having from 2 to about 6 carbon atoms, or a copolymer derived from at least one alkylene oxide having from 2 to about 6 carbon atoms and an amine, or a combination thereof. In yet a further embodiment the clay is present in an amount from about 1 to about 40 parts per 100 parts by weight of the composite, wherein the polymer is present in an amount from about 1 to about 60 parts by weight per 100 parts by weight of the composite, and wherein the binder component is present in an amount from about 0.5 to about 25 parts by weight per 100 parts by weight of the composite. In a further embodiment the clay is present in an amount from about 1 to about 30 parts per 100 parts by weight of the composite, wherein the polymer is present in an amount from about 1 to about 30 parts by weight per 100 parts by weight of the composite, and wherein the binder component is present in an amount from about 1 to about 10 parts by weight per 100 parts by weight of the composite. In another embodiment the (co)polymer is a water soluble (co)polymer. In another embodiment the water soluble (co)polymer is a starch, plant gum, modified cellulosic, lignin material, chitan, chitosan, pectin, a water soluble and dispersible protein, or combinations thereof. In still another embodiment the binder component is polyvinyl alcohol or a polymer or copolymer derived from two or more same or different alkylene oxides having from 2 to about 6 carbon atoms, or a combination thereof. In another embodiment the (co)polymer is derived from two or more same or different monomers comprising an olefin monomer, styrene, isoprene, butadiene, a cyclic olefin, a halogenated monomer, chlorinated isoprene, vinyl fluoride, vinylidene fluoride, acrylic monomer, vinyl acetate, an amine group containing monomer, aliphatic dialcohol, aromatic dialcohol, diamine, diisocyanate, dicarboxylic acid, a difunctional monomer containing one carboxylic acid and either one alcohol or amino group, arylene oxide, arylene sulfide, arylene sulfone, and a monomer having one or more epoxy groups, or combinations thereof. In a further embodiment the (co)polymer is corn starch, potato starch, amaranth starch, arrowroot starch, banana starch, barley starch, cassava starch, millet starch, oat starch, rice starch, rye starch, sago starch, sorghum starch, sweet potato starch, wheat starch or yam starch or combinations thereof. Combinations of the embodiments are envisioned.

In a further embodiment a clay aerogel is disclosed comprising: a clay; and a water soluble salt in an amount from about 0.05 to about 20 parts by weight per 100 parts by weight of the clay. In another embodiment the salt is present in an amount from about 0.05 to about 10 parts by weight. In a further embodiment the aerogel further includes a (co)polymer or a binder component, or combinations thereof. In yet another embodiment the binder component is polyvinyl alcohol, a polymer or copolymer derived from two or more same or different alkylene oxide monomers having from 2 to about 6 carbon atoms, or a copolymer derived from at least one alkylene oxide having from 2 to about 6 carbon atoms and an amine, or a combination thereof. In a further embodiment the clay is present in an amount from about 1 to about 40 parts per 100 parts by weight of the composite, wherein the polymer is present in an amount from about 1 to about 60 parts by weight per 100 parts by weight of the composite, and wherein the binder component is present in an amount from about 0.5 to about 25 parts by weight per 100 parts by weight of the composite. In a further embodiment the clay is present in an amount from about 1 to about 30 parts per 100 parts by weight of the composite, wherein the polymer is present in an amount from about 1 to about 30 parts by weight per 100 parts by weight of the composite, and wherein the binder component is present in an amount from about 1 to about 10 parts by weight per 100 parts by weight of the composite. In another embodiment the (co)polymer is derived from two or more same or different monomers comprising an olefin monomer, styrene, isoprene, butadiene, a cyclic olefin, a halogenated monomer, chlorinated isoprene, vinyl fluoride, vinylidene fluoride, acrylic monomer, vinyl acetate, an amine group containing monomer, aliphatic dialcohol, aromatic dialcohol, diamine, diisocyanate, dicarboxylic acid, a difunctional monomer containing one carboxylic acid and either one alcohol or amino group, arylene oxide, arylene sulfide, arylene sulfone, and a monomer having one or more epoxy groups, or combinations thereof. In yet a further embodiment the (co) polymer is corn starch, potato starch, amaranth starch, arrowroot starch, banana starch, barley starch, cassava starch, millet starch, oat starch, rice starch, rye starch, sago starch, sorghum starch, sweet potato starch, wheat starch or yam starch or combinations thereof. Combinations of the embodiments are envisioned.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

What is claimed is:

1. A packaging material, consisting of:
    a freeze-dried clay aerogel polymer composite, consisting of:
        a clay comprising at least one of a layered clay and a smectic clay;
        at least one (co)polymer chosen from a polyelectrolyte polymer having more than one carboxylic acid, a water dispersible protein, a (co)polymer derived from a dicarboxylic acid monomer, a (co)polymer derived from a difunctional monomer having one carboxylic acid, a (co)polymer derived from a monomer having at least one epoxy group, and a cellulosic polymer modified to include a polyfunctional monomer;
        a binder component comprising at least one of polyvinyl alcohol and polyethylene imine; and
        optionally one or more of an initiator and a crosslinker,
        wherein the clay is present in an amount from about 1 to about 99 parts per 100 parts by weight of the composite, wherein the (co)polymer is present in an amount from about 1 to about 99 parts by weight per 100 parts by weight of the composite, wherein the binder component is present in an amount from about 0.1 to about 40 parts by weight per 100 parts by weight of the composite, and wherein density of the composite is less than 1.0 g/cm$^3$, and
        wherein the clay, the at least one (co)polymer, the binder component, the optional initiator, and the optional crosslinker are subjected to freeze-drying to produce the freeze-dried clay aerogel polymer composite,
    wherein the packaging material is a plurality of free-flowing freeze-dried clay aerogel polymer composite particles, each particle having a substantially cylindrical shape and being configured to cushion a packaged article, and
    wherein the composite is a clay aerogel polymer ceramic composite.

2. The packaging material according to claim 1, wherein the clay is present in an amount from about 1 to about 40 parts per 100 parts by weight of the composite, wherein the (co) polymer is present in an amount from about 1 to about 60 parts by weight per 100 parts by weight of the composite, and wherein the binder component is present in an amount from about 0.5 to about 25 parts by weight per 100 parts by weight of the composite.

3. The packaging material according to claim 2, wherein the clay is present in an amount from about 1 to about 30 parts per 100 parts by weight of the composite, wherein the (co) polymer is present in an amount from about 1 to about 30 parts by weight per 100 parts by weight of the composite, and wherein the binder component is present in an amount from about 1 to about 10 parts by weight per 100 parts by weight of the composite.

4. The packaging material according to claim 1, wherein the composite density is from 0.03 to about 0.07 g/cm$^3$.

5. The packaging material according to claim 4, wherein the composite density is from 0.04 to about 0.07 g/cm$^3$.

6. The packaging material according to claim 1, wherein the composite further consists of one or more of the initiator and the crosslinker.

7. A packaging material, consisting of:
    a freeze-dried clay aerogel polymer composite, consisting of:
        a clay comprising at least one of a layered clay and a smectic clay;
        at least one (co)polymer chosen from a polyelectrolyte polymer having more than one carboxylic acid, a water dispersible protein, a (co)polymer derived from a dicarboxylic acid monomer, a (co)polymer derived from a difunctional monomer having one carboxylic acid, a (co)polymer derived from a monomer having at least one epoxy group, and a cellulosic polymer modified to include a polyfunctional monomer;

a binder component comprising at least one of polyvinyl alcohol and polyethylene imine; and optionally one or more of an initiator and a crosslinker, wherein the clay is present in an amount from about 1 to about 99 parts per 100 parts by weight of the composite, wherein the (co)polymer is present in an amount from about 1 to about 99 parts by weight per 100 parts by weight of the composite, and wherein the binder component is present in an amount from about 0.1 to about 40 parts by weight per 100 parts by weight of the composite, and wherein the composite is solvent sublimated, and wherein the clay, the at least one (co)polymer, the binder component, the optional initiator, and the optional crosslinker are subjected to freeze-drying to produce the freeze-dried clay aerogel polymer composite, wherein the packaging material is a plurality of free-flowing freeze-dried clay aerogel polymer composite particles, each particle having a substantially cylindrical shape and being configured to cushion a packaged article, and wherein the composite is a clay aerogel polymer ceramic composite.

8. The packaging material according to claim 7, wherein the clay is present in an amount from about 1 to about 40 parts per 100 parts by weight of the composite, wherein the (co) polymer is present in an amount from about 1 to about 60 parts by weight per 100 parts by weight of the composite, and wherein the binder component is present in an amount from about 0.5 to about 25 parts by weight per 100 parts by weight of the composite.

9. The packaging material according to claim 8, wherein the clay is present in an amount from about 1 to about 30 parts per 100 parts by weight of the composite, wherein the (co) polymer is present in an amount from about 1 to about 30 parts by weight per 100 parts by weight of the composite, and wherein the binder component is present in an amount from about 1 to about 10 parts by weight per 100 parts by weight of the composite.

10. The packaging material according to claim 7, wherein the composite density is less than 1.0 g/cm$^3$.

11. The packaging material according to claim 10, wherein the composite density is from 0.04 to about 0.07 g/cm$^3$.

12. The packaging material according to claim 7, wherein the composite further consists of one or more of the initiator and the crosslinker.

13. The packaging material according to claim 1, wherein the (co)polymer is a polyelectrolyte polymer having more than one carboxylic acid.

14. The packaging material according to claim 1, wherein the (co)polymer is a water dispersible protein.

15. The packaging material according to claim 1, wherein the (co)polymer is at least one of a (co)polymer derived from a dicarboxylic acid monomer, and a (co)polymer derived from a difunctional monomer having one carboxylic acid.

16. The packaging material according to claim 1, wherein the (co)polymer is a (co)polymer derived from a monomer having at least one epoxy group.

17. The packaging material according to claim 1, wherein the (co)polymer is a cellulosic polymer modified to include a polyfunctional monomer.

18. The packaging material according to claim 7, wherein the (co)polymer is a (co)polymer derived from a monomer having at least one epoxy group.

19. The packaging material according to claim 1, wherein a length of each cylindrically shaped free-flowing particle is from about 1 to about 3 inches.

20. The packaging material according to claim 7, wherein a length of each cylindrically shaped free-flowing particle is from about 1 to about 3 inches.

* * * * *